(No Model.)

J. ATKINSON.
Rotary Rock Drill.

No. 229,074.            Patented June 22, 1880.

Witnesses:
Jno. E. Gavin
Chas. M. Higgins

Inventor:
John Atkinson
by S. H. Wales
Atty.

N. PETERS, PHOTO-LITHOGRAPHER, WASHINGTON, D. C.

UNITED STATES PATENT OFFICE.

JOHN ATKINSON, OF NEW YORK, N. Y.

ROTARY ROCK-DRILL.

SPECIFICATION forming part of Letters Patent No. 229,074, dated June 22, 1880.

Application filed March 12, 1880. (No model.)

*To all whom it may concern:*

Be it known that I, JOHN ATKINSON, of New York city, county and State of New York, have invented certain new and useful Improvements in Rotary Rock-Drills, of which the following is a specification.

In this invention the diamonds or other cutting-bits, instead of being mounted on the tube, are on a stock which is capable of being removed from the tube without removing the tube from the bore, and some of said bits are mounted on expanding arms or supports, by which they can be withdrawn within the bore of the tube for so removing the drill, and be extended again outwardly when inserted in the tube again, and at the same time the tube serves for applying the power for working the drill by rotating it, all as hereinafter more fully described, reference being had to the accompanying drawings, in which—

Figure 1:
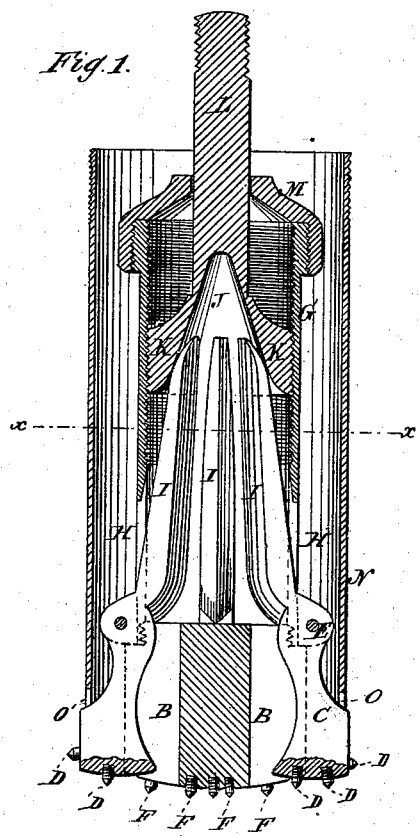
Figure 2:
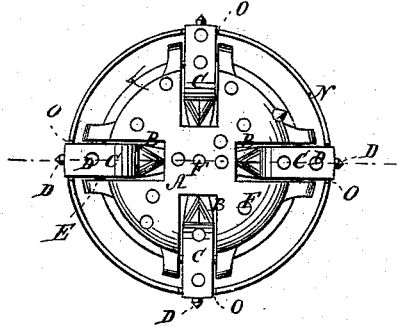
Figure 3:
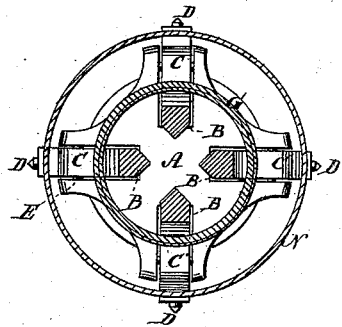

Figure 1 is a sectional elevation of my improved drill, including a short section of the lower end of the tube, also of the adjusting-rod for expanding and contracting the adjustable part of the bit-carrier. Fig. 2 is a plan of the lower end, and Fig. 3 is a transverse section of Fig. 1 in the line *x x*.

The central part of the drill-head or bit-carrier consists of the metallic block A, in which there are four or any other approved number of vertical and radial grooves or chambers, B, in which the radially-adjustable or expanding jaws C, for carrying the outer or circumferential portion of the bits D, are pivoted at E, while those bits, F, which are to drill the central portion of the bore are mounted in the end of block A. This block A is attached at its upper end to the vertical tube G, which is slotted upward a short distance at H, in coincidence with grooves B for the upper arms, I, of the expanding jaws, which arms extend upward in said tube G, and at the same time converge sufficiently to enter the conical socket J in the under side of the head K of the adjusting-rod L, which extends to the surface for expanding the jaws and releasing them by screwing the head up and down within the internally-threaded tube G, to which said head is fitted.

M is a cap screwing onto the top of tube G, for excluding the gritty matters that would otherwise drop into the tube, and for a guide to the rod L, which passes through a hole in its center.

N is the main drill-tube, inclosing the rest of the device and forming the case to the cone, and serving to apply the power for drilling. It is simply a plain tube with notches O, corresponding in number and position with the jaws C, to permit them to expand so as to project the cutting-bits beyond the circumference for cutting the bore larger than the tube, and for turning the bits by the tube, which, at these slots, bears against the jaws, and thus revolves them and the block A.

By this contrivance the bit-carrying portion of the drill can be removed at will without the labor and delay of removing the tube whenever it may be required to remove the cuttings or repair the drill, or for the removal of quicksand, which is often encountered in deep borings.

The expanding jaws may, of course, be so constructed as to carry all the cutting-bits by broadening the lower ends and fixing block A so as to allow them to extend to and overlap each other a little at the center; but probably the arrangement shown is the best for practical use.

What I claim as my invention is—

1. The combination, in a rock-drill, of the main drill-tube N, serving to rotate and inclose the drill or bits, with an internal insertible and removable drill-head or bit-stock, provided with an expansible or contractible series of bits, and a means of expanding or contracting the same, whereby the said bits may be expanded into engagement with and beyond the circumference of the drill-tube, or contracted within and out of engagement therewith, to permit the removal of the drill from the tube without removing the tube from the bore, substantially as herein shown and described.

2. The combination, with the rotating main drill-tube N, provided with circumferential slots or notches at its lower extremity, of the bit-stock A H, and a series of expanding and contracting bit-jaws, C, and a device moving in the said stock to expand or contract the said bit-jaws into or out of engagement with the slots of the tube N, whereby the drill may be operated by the rotation of the tube or removed from the tube, as required, substantially as herein shown and described.

3. The combination, in a rock-drill, of the rotary main tube N, having the slots or notches O, with the internal removable bit-stock, A H, expanding and contracting bit-jaws C, and vertically-adjustable hollow cone J K, moving in the stock and engaging the bit-jaws to expand the same, substantially as herein shown and described.

JOHN ATKINSON.

Witnesses:
EDWARD H. WALES,
JNO. E. GAVIN.